United States Patent

Chang

(10) Patent No.: US 7,181,683 B2
(45) Date of Patent: Feb. 20, 2007

(54) METHOD OF SUMMARIZING MARKUP-TYPE DOCUMENTS AUTOMATICALLY

(75) Inventor: Eun Yeung Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 435 days.

(21) Appl. No.: 10/301,794

(22) Filed: Nov. 22, 2002

(65) Prior Publication Data

US 2003/0101415 A1 May 29, 2003

(30) Foreign Application Priority Data

Nov. 23, 2001 (KR) ............... 10-2001-0073201

(51) Int. Cl.
*G06F 15/00* (2006.01)
(52) U.S. Cl. .................. 715/513; 715/526; 715/530
(58) Field of Classification Search ............ 715/513, 715/526, 530
See application file for complete search history.

(56) References Cited

U.S. PATENT DOCUMENTS

| 6,029,180 | A * | 2/2000 | Murata et al. ........... 715/501.1 |
| 6,092,081 | A * | 7/2000 | Alpert et al. ............ 707/104.1 |
| 6,175,830 | B1 * | 1/2001 | Maynard .................... 707/5 |
| 6,308,324 | B1 * | 10/2001 | Roediger et al. .......... 717/158 |
| 6,405,226 | B1 * | 6/2002 | Alpert et al. ............ 715/530 |
| 2001/0037510 | A1 * | 11/2001 | Lee ..................... 725/109 |
| 2002/0078091 | A1 * | 6/2002 | Vu et al. ................ 707/513 |
| 2002/0078165 | A1 * | 6/2002 | Genty et al. ............. 709/217 |
| 2002/0138528 | A1 * | 9/2002 | Gong et al. .............. 707/530 |
| 2002/0143896 | A1 * | 10/2002 | Hansmann et al. ......... 709/218 |
| 2004/0122731 | A1 * | 6/2004 | Mannik et al. ............ 705/14 |

* cited by examiner

*Primary Examiner*—Stephen Hong
*Assistant Examiner*—Kristina Honeycutt
(74) *Attorney, Agent, or Firm*—Birch, Stewart, Kolasch & Birch, LLP

(57) ABSTRACT

A method of summarizing markup-type documents is provided to automatically summarize the documents more quickly as well as being suitable for providing a user with a reliable document quality through true summary to the documents. This method includes the steps of previously establishing weights of the tags, respectively, extracting at least one of the markup-type documents when a random user requests a document search using a specific keyword, computing weights for the respective elements of the extracted markup-type document by applying the previously established weights thereto, and a fourth step of arranging the elements in a manner that the element having the computed value of a higher order is arranged with priority to generate a summary document with the contents of the corresponding elements.

11 Claims, 10 Drawing Sheets cast.html

```
<html>
<head>
<title>character</title>  ---------------------  5×0.8=4.0
</head>
<body>
<h2>character</h2>  ---------------------  4×0.8=3.2
<h3>Kim Young-ho</h3>  -------------------  3×0.8=2.4
<p> <a href="cast1.html">(Seol Kyung-ku)</a>  --  2×0.8=1.6
    since 1979 ...
</p>  -----------------------------------  1×0.8=0.8
<h3>Yoon Soon-im<h3>  --------------------  3×0.8=2.4
<p> <a href="cast2.html">(Moon So-ri)</a>  ----  2×0.8=1.6
    our first love ...</p>  ---------------  1×0.8=0.8
<h3>Yang Hong-ja<h3>  --------------------  3×0.8=2.4
<p> <a href="cast3.html">(Kim Yeo-jin)</a>  ----  2×0.8=1.6
    Korean character ...</p>  --------------  1×0.8=0.8
</body>
</html>
```

FIG. 3

| Weight | Category Class | Category Item |
|---|---|---|
| 1.0 | C1 | Entertainments |
| 0.9 | C2 | Movies and film |
| 0.8 | C3 | People |
| 0.7 | C4 | Actor / Actress |

FIG. 4

| Weight | Tag (description) |
|---|---|
| 5 | <title> (representing a title) |
| 4 | <h1>,<h2> (representing adjustment of a letter size) |
| 3 | <h3>,<h4>,<h5>,<h6> (representing adjustment of a letter size) |
| 2 | <a> (representing a link) |
| 1 | <p> (representing section division) |

FIG. 7A index.html

```
<html>
<head>
<title>Peppermint candy</title>                      ---- 5×1.0=5.0
</head>
<body>
<img src="main_title.gif" alt="main_title">
<h4>Movie of second screen achievements ...          ---- 3×1.0=3.0
     style directed by Lee Chang-Dong</h4>
<p> <a href="film.html">Movie story</a><br>          ---- 2×1.0=2.0
    <a href="cast.html">Character</a><br></p>        ---- 2×1.0=2.0
</body>
</html>
```

FIG. 7B film.html

```
<html>
<head>
<title>Movie story</title>                           ---- 5×0.9=4.5
</head>
<body>
<h2>movie story</h2>                                 ---- 4×0.9=3.6
<p>This movie goes back to the time ...</p>          ---- 1×0.9=0.9
<p>one human ...</p>                                 ---- 1×0.9=0.9
</body>
</html>
```

FIG. 7C cast.html

```
<html>
<head>
<title>character</title>  ----------------------- 5×0.8=4.0
</head>
<body>
<h2>character</h2>  --------------------- 4×0.8=3.2
<h3>Kim Young-ho</h3>  ------------------ 3×0.8=2.4
<p> <a href="cast1.html">(Seol Kyung-ku)</a> -- 2×0.8=1.6
    since 1979 ...
</p>  ------------------------------------ 1×0.8=0.8
<h3>Yoon Soon-im<h3>  ------------------- 3×0.8=2.4
<p> <a href="cast2.html">(Moon So-ri)</a> ----- 2×0.8=1.6
    our first love ...</p>  ------------------- 1×0.8=0.8
<h3>Yang Hong-ja<h3>  ------------------- 3×0.8=2.4
<p> <a href="cast3.html">(Kim Yeo-jin)</a> ---- 2×0.8=1.6
    Korean character ...</p>  ---------------- 1×0.8=0.8
</body>
</html>
```

FIG.8A

| .html \ Final computation | 5.0 | 4.5 | 4.0 | 3.6 | 3.2 | 3.0 | 2.4 | ... |
|---|---|---|---|---|---|---|---|---|
| Index | Peppermint candy | — | — | — | — | Movie of second screen achievements ... style directed by Lee Chang-Dong | | ... |
| Film | — | Movie story | — | Movie story | — | — | — | ... |
| Cast | — | — | Character | — | Character | — | -Kim Young-ho -Yoon Soon-im -Yang Hong-ja | ... |
| | →9byte | →9byte | →9byte | →9byte | →9byte | →104byte | →27byte | |

FIG.8B

Peppermint candy
Movie of second screen achievements...style
directed by Lee Chang-Dong Movie story Character
Kim Young-ho
Yoon Soon-im
Yang Hong-ja (158byte)

METHOD OF SUMMARIZING MARKUP-TYPE DOCUMENTS AUTOMATICALLY

This nonprovisional application claims priority under 35 U.S.C. § 119(a) on Patent Application No. 2001-0073201 filed in KOREA on Nov. 23, 2001, which is herein incorporated by reference.

BACKGROUND OF THE INVENTION

1. Field of the Invention

The present invention relates to a method of summarizing markup-type documents automatically.

2. Discussion of the Related Art

Generally, supply of computers and development of network technology such as Internet enable users to make use of or gain access to numerous information (documents) on-line.

On-line documents were simple forms composed by texts initially but become complicated forms due to the generation of means for expressing the construction of the documents variously such as a markup language and the like.

In this case, the term "markup" means a work for describing a document constructed with texts or a logical structure of a word processing document. A markup language is used for such a work. The markup language is a series of characters and symbols inserted in a specific location of the document to describe the logical structure of the document. In addition, the document having the markup language inserted therein is called a markup document.

Since an amount of electronic documents of variously complicated forms such as the markup documents increases explosively to raise problems of the excessiveness of the accessible documents. Besides, searching the demanded document becomes a time-consuming job relatively. Hence, the advent of a document search system becomes inevitable.

Document search means that a user is provides with a sequence according to a specific condition by retrieving documents including a keyword (subject word) inputted by the user.

FIG. 1 illustrates a schematic diagram of a structure of a document search system for carrying out the above role.

Referring to FIG. 1, a document search system includes a plurality of user devices (e.g. PC, digital TV, etc.) enabling bi-directional communications, a server 1 having a search engine, and various servers (server 2 and server 3) providing documents requested by the search engine. Specifically, the used devices and servers are linked to networks providing the bi-directional communications such as Internet.

A user gain access to the server 1 including the search engine using his user device and then inputs a keyword to search.

The server 1 including the search engine retrieves documents corresponding to the user-inputting keyword to provide the user device with. In this case, the server 1 receives the documents corresponding to the keyword from its database or other servers (server2, server 3) existing on-line to provide the user device with.

The user then checks the documents according to the search result through his user device.

However, the amount of the search result corresponding to the keyword is enormous lately as well as it is unable to grasp whether the search result is correct or not. Substantially, the user has to find the requested document by checking all the documents corresponding to the search result one by one.

In order to overcome such a disadvantage of the document search system, a document summarizing system has been developed.

Document summarization means that contents of the enormous documents are reduced to a predetermined size. Specifically, unimportant or trivial parts of a plurality of the documents according to the document search result are skipped and core contents are extracted consistently. Namely, document summarization has a concept of document contents compression.

Generally, a document summarizing system is divided into a process of summarizing documents and a process of constructing keyword information of documents.

The document summarizing process starts from a parsing step of reading contents of the searched documents to classify into interpretation units for document summarization. In this case, the searched documents are regarded as a set of sections, each sentence is grasped as a set of words, and each of the words plays a role of a keyword as well as a least element of document summarization.

The process of constructing the keyword information of the documents is carried out in a manner that frequency information is collected by taking the word of the least element of the searched documents as a reference to construct the keyword information. After the keyword information has been constructed, a weight of each of the sentences is calculated to select the subject sentence.

The calculation of the weights of the sentences is carried out by two steps. Firstly, a point is given to each of the sentences centering around a frequency of entering the keyword. Secondly, the weight of each of the sentences is calculated according to the given point.

Once the weight of each of the sentences is calculated, a summary document amounting to a designated quantity is generated by extracting the sentences sequentially in order of high weights.

When the above-explained document summarizing system according to the related art is used, the contents of the summary document may lose its consistency. This is because the document summarizing system according to the related art provides the summary document by combining only the sentences containing the keywords with each other in part. Namely, it occurs occasionally that there is no content correlation between one and another sentences in the summarized document.

Hence, it happens frequently that partial combination of the sentences fails to make the user understand the entire contents of the documents prior to the summarization. Moreover, even if the sentence constructing the summary document includes the keyword, the overall contents of the summary document may not include the contents requested by the user.

Hence, the summary document generated from the document summarizing system according to the related art is a summary of the sentences included in the various searched documents, thereby being poor in the information contained in the summary document. Moreover, the entire contents of the various documents are confronted with the keyword to search, whereby it takes considerably much time to generate the summary document.

SUMMARY OF THE INVENTION

Accordingly, the present invention is directed to a method of summarizing markup-type documents automatically that substantially obviates one or more problems due to limitations and disadvantages of the related art.

An object of the present invention is to provide a method of summarizing markup-type documents automatically enabling to summarize the documents more quickly as well as being suitable for providing a user with a reliable document quality through true summary to the documents.

Another object of the present invention is to provide a method of summarizing markup-type documents automatically enabling to extract a reliable summary document more quickly using structural characteristics (tag, page depth, category) of the markup document provided on-line.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of summarizing markup-type documents automatically according to the present invention, each of the markup-type documents including at least one page associated with a plurality of elements, each of the elements inserted between tags as a content, the method includes a first step of previously establishing weights of the tags, respectively, a second step of computing weights for the respective elements of a specific markup-type document by applying the previously established weights thereto, and a third step of arranging the elements in a manner that the element having the computed value of a higher order is arranged with priority to generate a summary document with the contents of the corresponding elements.

Preferably, the method further includes the step of establishing a weight of each of the pages in accordance with a depth of each of the pages constructing the markup-type document.

Preferably, as a weight of each of the pages is further established in accordance with a depth of each of the pages constructing the markup-type document, the second step computes the weights for the respective elements of the markup-type document by further applying the established weights of the respective pages thereto.

Preferably, the method further includes the step of further establishing weight values of categories in accordance with classes of the categories constructing the markup-type document, respectively.

Preferably, as a weight of each of the pages is further established in accordance with classes of categories constructing the markup-type document, the second step computes the weights for the respective elements of the extracted markup-type document by further applying the established weights of the categories thereto.

Preferably, a summary range of the markup-type document is previously established before the third step of generating the summary document and wherein the third step generates the summary document with a quantity within the established summary range.

Preferably, a summary range of the pages which will become a summary target of the markup-type document is previously established before the third step of generating the summary document and wherein the third step is carried out on the pages of the summary target to generate the summary document.

Preferably, the third step includes the steps of arranging the elements in the manner that the elements having the computed values of the higher orders are arranged with priority, generating the summary document with texts of the corresponding elements in accordance with the arranged order, and outputting the generated summary document to a currently operating digital TV.

More preferably, the steps of generating and outputting the summary document generate the summary document with the texts of the corresponding elements in accordance with the arranged order and output the generated summary document to the digital TV with currently streaming video and audio.

In another aspect of the present invention, in summarizing markup-type documents to provide a digital TV with, the markup-type documents constructed with at least one page associated with a plurality of elements, each of the elements inserted between tags as a content, a method of summarizing the markup-type documents automatically includes a first step of previously establishing weights for the respective pages according to depths of the pages and weights for the respective tags, a second step of retrieving at least one of the markup-type documents when a random user requests a document search using a specific keyword, a third step of computing final weights for the respective elements of the retrieved markup-type document by applying the previously established weights thereto, a fourth step of arranging the elements in a manner that the element having the computed value of a higher order is arranged with priority to extract the contents of the corresponding elements, and a fifth step of outputting the extracted contents of the elements to the digital TV limitedly.

Preferably, the first step establishes a lower weight for the page having the deeper depth.

Preferably, the method further includes the step of further establishing a weight according to a class of ach of a plurality of categories constructing a structure of the markup-up type document.

Preferably, as weights according to classes of categories are further established respectively to provide for a case that a structure of the markup-type document is constructed with a plurality of the categories, the third step computes a final weight of each of the elements of the retrieved markup-type document by further applying the established weights for the respective categories thereto.

More preferably, as the weights according to the classes of the categories are further established respectively, final weights of the respective elements are computed by applying the weights for the classes of the respective categories, the weights for the respective tags, and the weights for the depths of the respective pages to the elements of the retrieved markup-type document, respectively and by multiplying the weights for the respective tags and the weights for the respective pages in each of the elements by the weights for the classes of the respective categories, respectively.

Preferably, the third step computes the final weight of each of the elements by applying the established weights to the respective elements of the retrieved markup-type document and by multiplying the weight for each of the tags by the weight for each of the pages in each of the elements.

Preferably, the fourth step arranges the elements in a manner that the elements having the computed values of the higher orders are arranged with priority and extracts texts of the corresponding elements in accordance with the arranged order.

Preferably, a summary range of the markup-type document is previously established before the fifth step.

Preferably, the fifth step comprising includes the steps of comparing, as a summary range of the markup-type document is previously established, a quantity of the content of the extracted element to the summary range and outputting the content of the extracted element within the summary range to the digital TV.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates an example that weights are given to category classes applied to the present invention;

FIG. 4 illustrates an example that weights are given to tags applied to the present invention;

FIGS. 6 to 8 illustrate diagrams of examples for a method of summarizing markup-type documents automatically according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
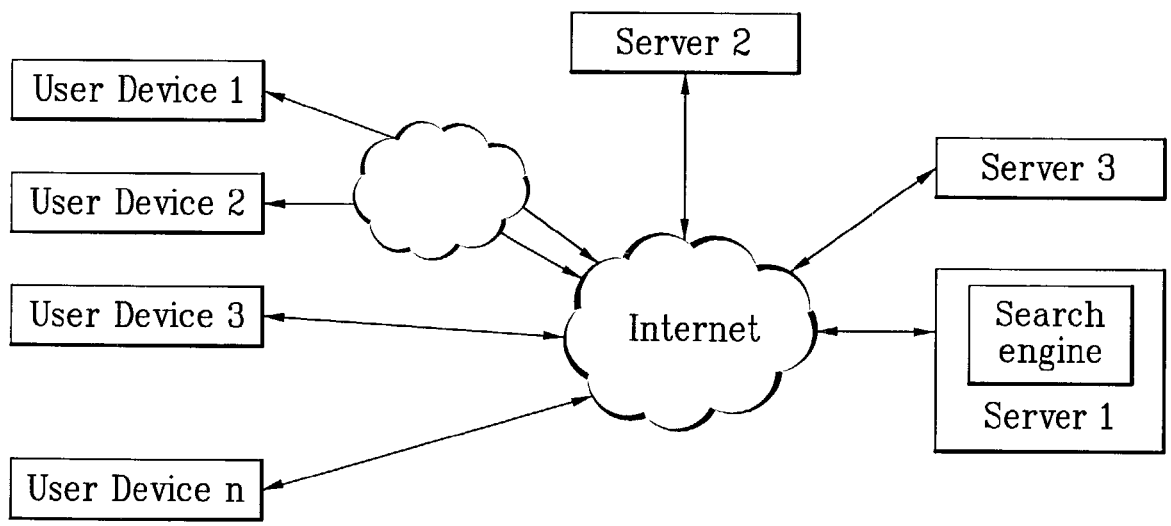
FIG. 1 illustrates a schematic block diagram of a general document search system.
Figure 2A:
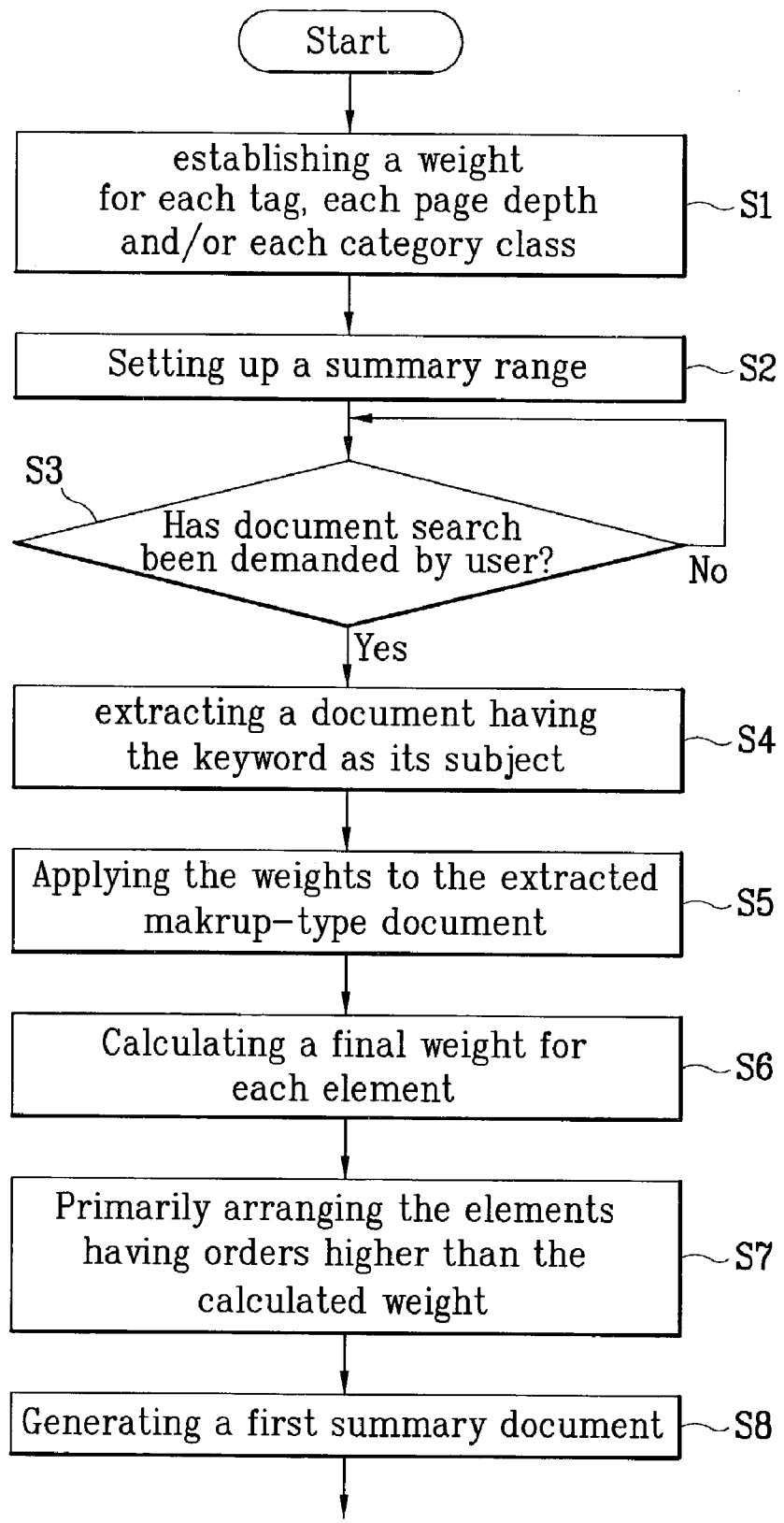
FIGS. 2A and 2B illustrate diagrams of a method of—summarizing a document automatically according to the present invention.
Figure 2B:
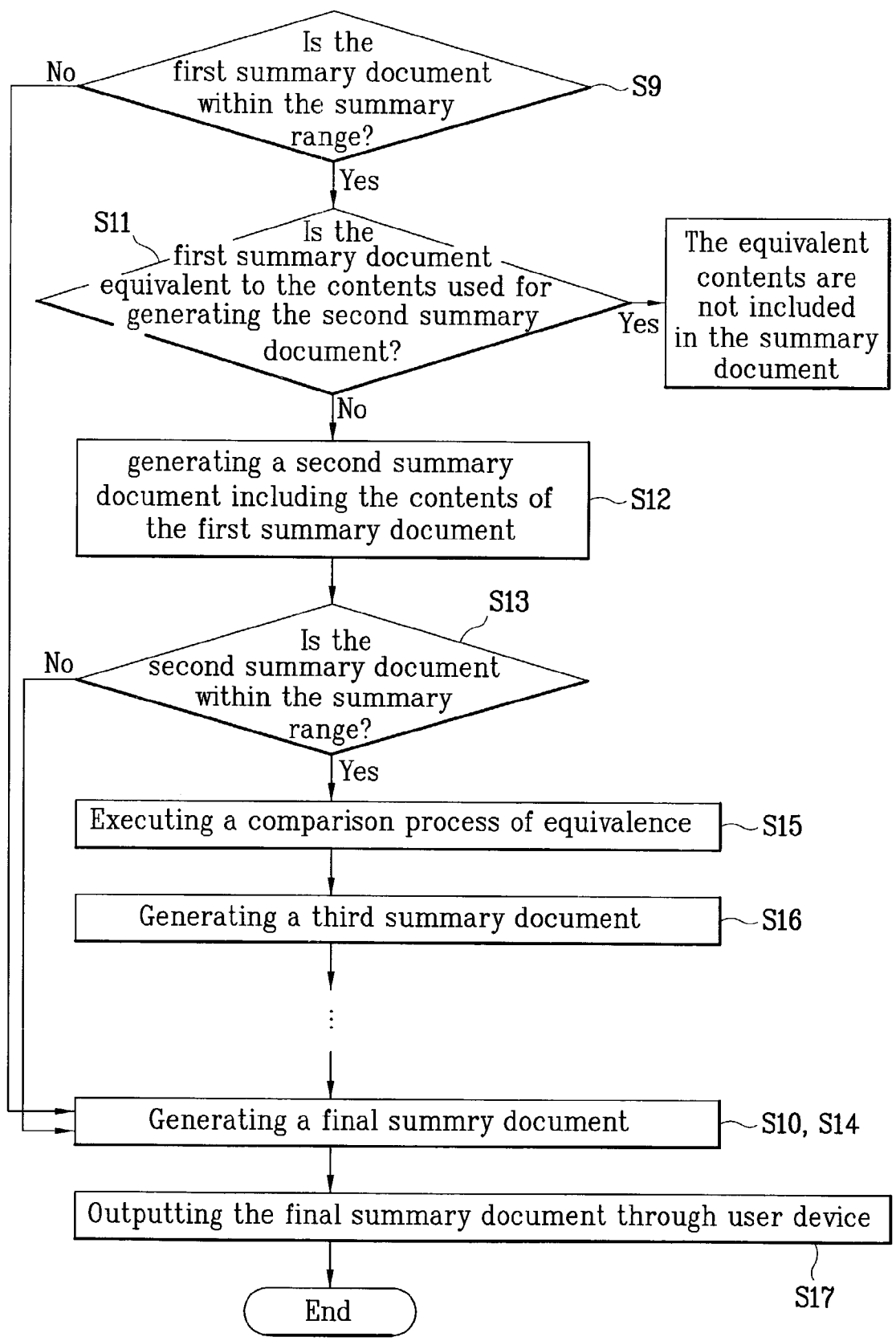

FIG. 2 illustrates a diagram of a method of a summarizing document automatically according to the present invention.

A markup-type document is a document composed by a markup language such as HTML (hypertext markup language) or XML (extensible markup language).

And, the markup-type document mostly includes tags and contents. And, the contents are inserted between the tags. Namely, each of the contents is inserted between a start-tag and an end-tag. And, one element includes a pair of tags (e.g. <title> . . . </title>and a content between a pair of the tags. For instance, a text of "markup-type document" is inserted between the start-tag of "<title>" and the end-tag of "</title>" to construct the element of "<title>markup-type document</title>".

Generally, the markup type document is constructed with combinations of the elements, and includes at least one page.

Yet, the markup-type document is classified into various categories by subject to be constructed with a plurality of pages.

When the markup-type document contains the contents classified into various categories, the content of each of the categories is constructed with different pages. Specifically, the document content of the category of a lower concept is formed in a deep page. Yet, in a single markup-type document, it is not necessary to construct the content of each of the categories on the pages differing in depth. Namely, a detailed explanation for a specific phrase in the contents of the markup-type document can be constructed with a lower page.

In brief, if one markup-type document contains the content of a large subject (in this case, the big subjects coincides with a keyword demanded by a user to some extent), each category contains a small subject belonging to the large subject. Hence, pages in lower depth contain the contents of the small subjects corresponding to the categories respectively or the contents for the phrase that will be described in detail in the content of the large subject.

Finally, the single markup-type document includes the pages classified into a plurality of categories and the pages in lower depth to describe a plurality of specific phrases in detail. Of course, since each of the categories includes a category of an upper concept and a category of a lower concept, the pages of the categories are formed in different depths according to their classes, respectively.

The present invention previously establishes a weight for each tag, each page depth, and/or each category class (S1). FIG. 3 illustrates an example that weights are given to category classes applied to the present invention and FIG. 4 illustrates an example that weights are given to tags applied to the present invention. Although not shown in the drawings, the weight for each page depth is established to be inverse proportion to the page depth (i.e. to be lower if the page depth is deeper).

Referring to FIG. 3, since the content of the category of higher class are more important, a higher weight is given as the category class gets higher. Exemplarily in FIG. 3, an weight '1.0' is given to C1 (entertainments) having the highest category class, 0.9 is given to C2 (movies and film), 0.8 is given to C3 (people: producers, screenwriters, composers, and directors), and 0.7 is given to C4 (actors/actresses).

Referring to FIG. 4, considering the general properties of the tags, the importance degrees of the contents inserted between the tags respectively differ from each other. Hence, in the present invention, weights are given in proportion to the importance degrees of the tags, respectively. For a single page of the markup-type document, as shown in FIG. 4, an weight "5" is given to the tag "<title> representing a title, an weight "4" is given to each of the tags "<h1>" and "<h2>" representing adjustment of a letter size respectively, an weight "3" is given to each of the tags "<h3>", "<h4>", "<h5>", and "<h6>" representing adjustment of a letter size respectively, an weight "2" is given to "<a>" representing a link, and an weight "1" is given to "<p>" representing section division.

A summary range of the markup-type document is set up previously (S2). Additionally, the present invention restricts summarization of a document having pages below a specific depth when the markup-type document retrieved by a user's demand is constructed with various pages. This is called a summary target page range. Hence, the present invention applies the previously established weight to the pages within the summary target page range. Yet, the establishment of the summary target page range is an implemental option. This is because the same effect of establishing the summary target page range is achieved by establishing the weight for each page depth.

The summary range is intended to restrict a quantity of a summary document when the contents of the markup-type document are summarized in part. If the summary range is 50 bytes, the markup-type document is summarized until the summary document becomes below 50 bytes.

Figure 5A:
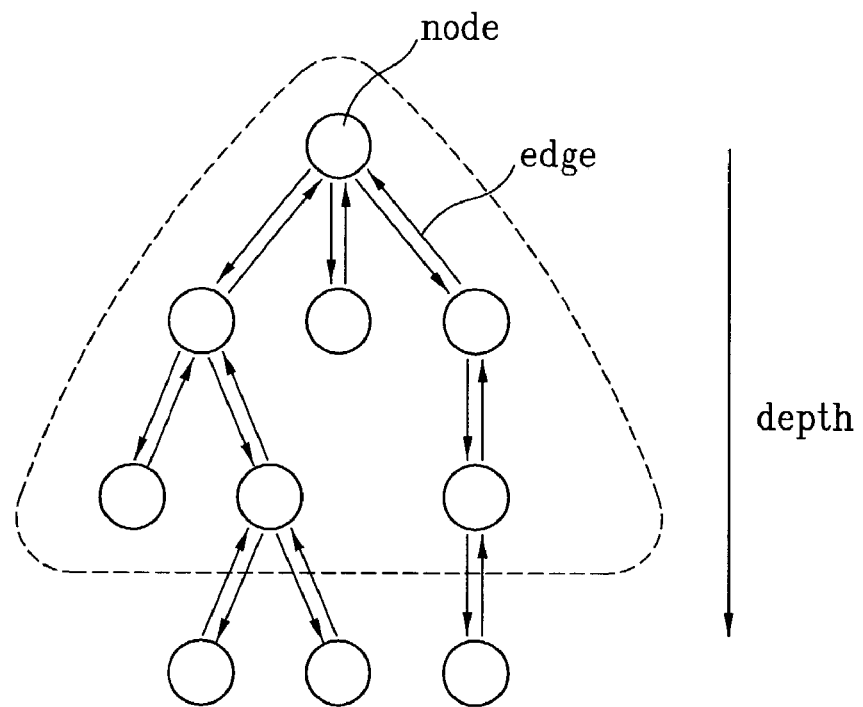
FIG. 5A and FIG. 5B illustrate examples for establishing ranges of pages to be summarized according to the present invention.
Figure 5B:
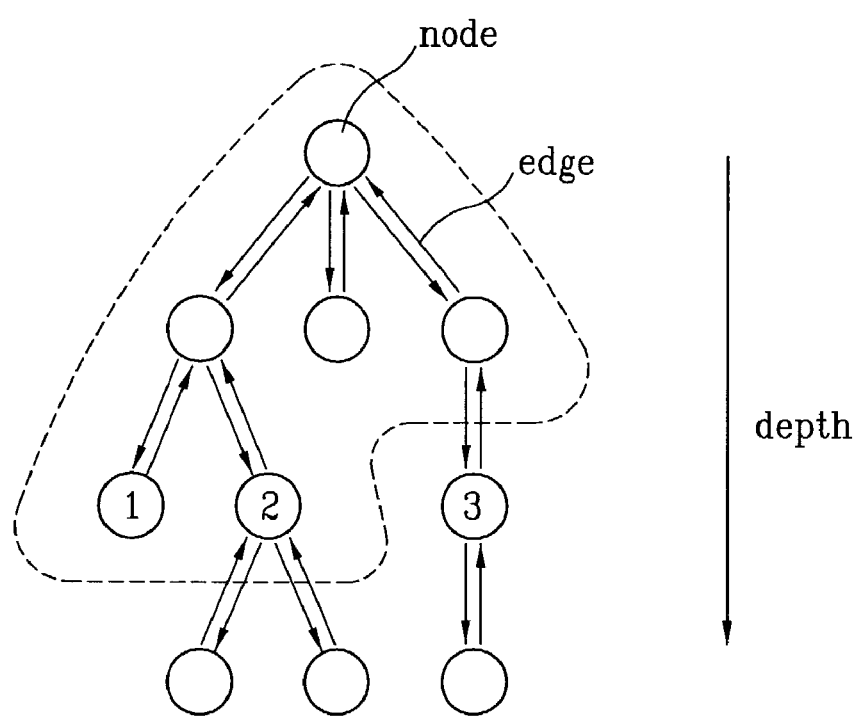

FIG. 5A and FIG. 5B illustrate examples for establishing the summary target page ranges according to the present invention.

When the extracted markup-type document as a result of search is constructed with a plurality of pages connected by hyperlink, the summary target page range is established by the following two methods. Nodes in FIG. 5A and FIG. 5B are pages of the respective depths and edges are hyperlinks connected to the pages of lower depth.

The first method, as shown in FIG. 5A, restricts the range to the pages at a predetermined depth from the most upper pages. Namely, in the example of FIG. 5A, the summary target page range for a single markup-type document is set to be the pages at two-steps below in depth.

The second method, as shown in FIG. 5B, the range is restricted to a predetermined count of pages from the most upper page. Namely, the example in FIG. 5B sets the summary target page range for a single markup-type document to six pages.

If the first method is used, the summary target page range includes seven pages. Yet, if the summary target page range, as shown in FIG. 5B, is established by the second method for the markup-type document constructed with total seven pages to the depth two-steps below, a predetermined number of pages should be excluded from the pages at the same depth. Namely, if the summary target page range, as shown in FIG. 5B, is set up to be six by the second method for the markup-type document constructed with seven pages to the depth of two-steps below, one of the pages existing in the depth of two-steps below should be excluded from the range.

In this case, the excluded page has a call order which is one step below those of the pages at the depth of two-steps below. The call order is determined in a reading order of content development of the markup-type document. Namely, the pages in the depth of two-step below, as shown in FIG. 5B, are read in order of (1, 2, 3). Hence, the third page of the pages in the depth of two-steps below is the least lower call order. And, the second method uses BFS (breath first search) algorithm.

After completion of the entire setup, if a random user uses a specific keyword to demand document search (S3), a single document having the keyword as its subject is extracted (S4). Specifically, the present invention is focused on the summarizing method for the documents composed with the markup language, whereby the extracted document is regarded as the markup-type document. In other case, after completion of the entire setup, if a random user request to sum a specific markup-type document, the requested markup-type document is summarized according to the following detailed process (S5~S17) of the present invention.

And, the previously established weights are applied to the markup-type document (which is extracted by the operation of the document search or requested by user) document. In this case, the weights for the respective tags, a combination of at least one of the weights for the respective page depths, and the weights for the respective category classes is applied to the markup-type document, which is a matter of implementation. Hence, in the following description of the present invention, examples of applying the weights for the respective tags and category classes are explained.

The weights for the respective tags and the weights for the respective category classes are applied to the markup-type document being summarized (S5).

And, a final weight for each element constructing the markup-type document is calculated (S6). Specifically, the weights for the category classes are given to the categorized ages of the markup-type document, respectively and the weights for the respective tags are given to the tags constructing the categorized pages, respectively. And, the give weights are multiplied. The final weight is then calculated for each of the elements. As an operation used for calculating the final weight, adding the two weights can be used instead of multiplication.

After the end of calculating the final weight for each element, the elements having orders higher than the calculated weight are primarily arranged (S7) to generate the summary document from the contents of the respective elements according to the arranged order (S8~S14).

More specifically, a first summary document is generated using initially the contents of the elements arranged in the highest order of the calculated weights (S8), and it is checked by comparison whether a quantity of the generated first summary document is within the summary range or not (S9). If the quantity of the generated first summary document exceeds the summary range, a final summary document is generated to the extent of the summary range among the contents of the elements used for generating the summary document initially (S10). On the other hand, if the quantity of the first summary document is within the summary range, a second summary document including the contents of the first summary document is generated using further the contents of the elements arranged in a second order (S12). And, it is checked again by comparison whether a quantity of the second summary document is within the summary range or not (S13). In this case, prior to the generation of the second summary document, it is checked by comparison whether the contents of the first summary document is equivalent to the contents used for generating the second summary document (S11). If equivalent, the equivalent contents are not included in the summary document. Such comparison of equivalence is repeated in the course of generating the summary document until the summary range reaches its limit. Thereafter, the second summary document is generated. If the quantity of the generated second summary document exceeds the summary range, a final summary document is generated by adding the second summary document, from which the quantity of the first summary document is subtracted within the summary range, to the first summary document (S14). On the other hand, if the quantity of the second summary document is within the summary range, a comparison process (S15) of equivalence is carried out and then a third summary document including the contents of the first and second summary documents is generated using the contents of the elements arranged in a third order (S16).

Thereafter, the above operation is repeated to generate a final summary document within the summary range. In case that the contents of various elements are extracted to the previously established summary target page range so that the quantity of the extracted summary document fails to exceed the summary range, the extracting operation is ended to generate the final document.

Substantially, most of the contents of respective elements are test-type. Hence, the final summary document constructed with texts is generated.

Additionally, the present invention further includes the steps of filing the generated final summary document.

Namely, for the final summary document having been arranged in the orders of the final weight computation values, the contents constructing the final summary document are rearranged by category class. Thereafter, such a rearrangement operation is implemented through FIG. 6 to FIG. 8.

The final summary document generated by the above-explained method is output through the user device (e.g. personal computer, digital TV, etc.) (S17). More preferably, the text type summary document is outputted through the digital TV.

In this case, the summary document is outputted through the digital TV together with audio and video.

Figure 6:
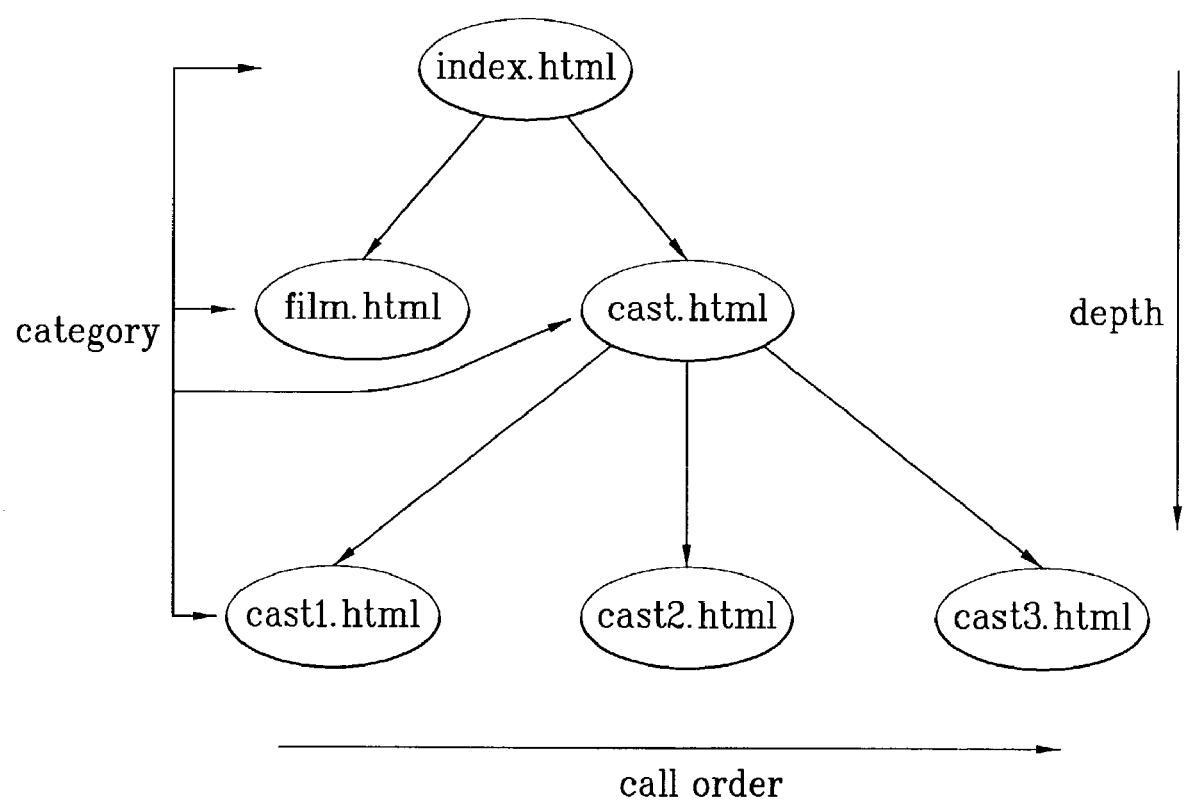

FIGS. 6 to 8 illustrate diagrams of examples for a method of summarizing markup-type documents automatically according to the present invention. One example is explained by referring to FIGS. 6 to 8 as follows.

FIG. 6 illustrates a structural diagram of a markup-type document composed by HTML.

Referring to FIG. 6, a HTML document in FIG. 6 includes categories of four classes. A single "index.html" page corresponding to the category of a most upper class exists in most upper depth, and a single "film.html" page corresponding to the category of a second class and a single "cast.html" page corresponding to the category of a third class exist in the depth of a first step. In the depth of a least lower step, three "cast1.html", "cast2.html", and "cast3.html" pages corresponding to the category of a fourth class exist. And, the three pages exist in the depth of the least lower step have call orders determined sequentially. Namely, the "cast1.html" has the most upper call order, the "cast2.html" page has the next call order, and the "cast3.html" page has the final order.

Hence, the HTML document in FIG. 6 is constructed with total six pages.

When the HTML document in FIG. 6 is substantially like FIGS. 7A to 7C, the automatic summarizing method according to the present invention is applied.

First of all, the weights for the respective tags are established like FIG. 4. In aspect of the weights for the respective tags shown in FIG. 4, a weight 5 is given to a tag of "<title>" for a markup-type document title, a weight 4 is given to each tags of "<h1>" and "<h2>" for regulating text size, a weight 3 is given to each tags of "<h3>", "<h4>", "<h5>", and "<h6>" for regulating text size, a weight 2 is given to a tag of "<a>" for linking, and a weight 1 is given to a tag of "<p>" for section division.

The weight for each category class is established in the order of (1.0), (0.9), (0.8), and (0.7) from an upper class. And, the weight for each page depth is established in the order of (1.0), (0.9), and (0.8) from an upper depth. Yet, the present invention enables to determine a species of the applicable weight in generating the summary document of the present invention. Hence, the weight for each tag and the weight for each category class are applied in the following description.

Moreover, the summary target page range is established as pages in two-step depth and the summary range is established as 158 bytes.

Thereafter, if the final weight for each element of the document shown in FIG. 7A is calculated by applying the established weights thereto, a final weight computation value of "<title> peppermint candy</title>" as a first element is "5.0" attained by multiplying the category class weight "1.0" given to the entire document of FIG. 7A by the weight "5" given to the tag of "<title>". A second weight computation value of "<h4>Movie of second screen achievements . . . style directed by Lee Chang-Dong</h4>" as a second element is "3.0" attained by multiplying the category class weight "1.0" given to the entire document of FIG. 7A by the weight "3" given to the tag of "<h4>". A third weight computation value of "<a href="film.html">movie story</a>" as a third element is "2.0" attained by multiplying the category class weight "1.0" given to the entire document of FIG. 7A by the weight "2" given to the tag of "<a>". And, a fourth weight computation value of "<a href="cast.html">characters</a>" as a fourth element is "2.0" as well.

If the final weight for each element of the document shown in FIG. 7B is calculated by applying the established weights thereto, a final weight computation value of "<title>movie story</title>" as a first element is "4.5" attained by multiplying the category class weight "0.9" given to the entire document of FIG. 7B by the weight "5" given to the tag of "<title>". A second weight computation value of "<h2>movie story</h2>" as a second element is "3.6" attained by multiplying the category class weight "0.9" given to the entire document of FIG. 7B by the weight "4" given to the tag of "<h2>". A third or fourth weight computation value of "<p>This movie goes back to the time . . . </p>" or "<p>one human . . . </p>" as a third or fourth element is "0.9" attained by multiplying the category class weight "0.9" given to the entire document of FIG. 7B by the weight "1" given to the tag of "<p>".

If the final weight for each element of the document shown in FIG. 7C is calculated by applying the established weights thereto, a final weight computation value of "<title>character</title>" as a first element is "4.0" attained by multiplying the category class weight "0.8" given to the entire document of FIG. 7C by the weight "5" given to the tag of "<title>". A second weight computation value of "<h2>character</h2>" as a second element is "3.2" attained by multiplying the category class weight "0.8" given to the entire document of FIG. 7C by the weight "4" given to the tag of "<h2>". A third weight computation value of "<h3>Kim Young-ho</h3>" as a third element is "2.4" attained by multiplying the category class weight "0.8" given to the entire document of FIG. 7C by the weight "3" given to the tag of "<h3>". And, the final weight computation values of "<h3>Yoon Soon-im<h3>" and "<h3>Yang Hong-ja</h3>" as the following elements are "2.4" as well. A fourth weight computation value of "<a href="cast1.html">(Seol Kyung-ku)</a>" as a fourth element is "1.6" attained by multiplying the category class weight "0.8" given to the entire document of FIG. 7C by the weight "2" given to the tag of "<a>". The final weight computation values of "<a href="cast2.html">(Moon So-ri)</a>" and "<a href="cast3.html">(Kim Yeo-jin)</a>" as the following elements are "1.6" as well. And, the final weight computation values of other elements such as "<p>since 1979 . . . </p>", "<p>since 1979 . . . </p>", "<p>our first love . . . </p>", and "<p>Korean character </p>" are "1.6" as well.

After the final weight computation values for the respective elements have been calculated, the element having the higher final weight computation value, as shown in FIG. 8A, is arranged with priority. The summary document is then generated by extracting the contents of the elements in order of the arrangement status.

In this case, since the summary range has been established as 158 bytes previously before the generation of the summary document, the content of "Peppermint candy" having the final weight computation value of the most upper element is extracted to compare its quantity to the previously established summary range.

Since the quantity of the content having the final computation value of the most upper element is 9 bytes, the content of another element having the next final computation value in order is further extracted to be compared to the previously established summary range as well as is checked whether to be equivalent to the previously extracted content. If the contents of the elements from the higher order are extracted in such a manner, it is able to extract the contents of the elements to the extent of the final computation value of "2.4" in FIG. 8A. Yet, the content of the element having the final computation value of "3.6" in the "film.html" page and the content of the element having the final computation value of "3.2" in the "cast.html" page are excluded from the extracting objects. Namely, the method of summarizing the markup-type documents automatically according to the present invention excludes the contents equivalent to the previously extracted contents in the course extraction by comparison when the contents of the respective elements are extracted, whereby the same contents of the previously extracted are not extracted.

Therefore, the final summary document shown in FIG. 8B is generated. In this case, the final summary document shown in FIG. 8B follows the rearrangement operation according to the present invention.

Namely, for the final summary document arranged previously in accordance with the order of the final weight computation value, the present invention rearranges the contents constructing the final summary document by category class. Specifically, the final summary document shown in FIG. 8B has been arranged in the order of "Peppermint candy" "Movie story" "Character" "Movie of second screen achievements . . . style directed by Lee Chang-Dong" "Kim Young-ho" "Yoon Soon-im" "Yang Hong-ja". Yet, the present invention rearranges them by category class in the following manner to generate the final summary document shown in FIG. 8B. First of all, the contents of the page of "index.html" of the most upper category are arranged. Secondly, the contents of the page of "film.html" of a succeeding order are arranged subsequently. Finally, the contents of the page of "cast.html" of the last order are arranged.

The above-described method of summarizing the markup-type documents automatically according to the present invention is applicable to a digital broadcasting supporting various message services as well as a search system using Internet.

Namely, the method of summarizing the markup-type documents automatically according to the present invention is applicable to a system for providing the digital broadcast contents with the markup-type documents composed by HTML or XML (extensible markup language) as well as is used for summarizing electronic documents retrieved through Internet.

Accordingly, the method of summarizing the markup-type documents automatically according to the present invention summarizes the document constructed with a plurality of pages into one using the tags and category classes or page depths of the markup-type documents provided by the search, thereby enabling to shorten the time taken to summarize the complicated documents. Besides, the user is provided with the summarized information, thereby enabling to gain access to the reliable information. Specifically, the summarized information can be easily understood by the user.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of summarizing a markup-type document automatically, the method comprising:
    retrieving a markup-type document including at least one page associated with a plurality of elements, each of the elements inserted between tags as a content;
    establishing weights of the tags respectively in advance;
    establishing a weight of each of the at least one page in accordance with a depth of each of the at least one page constructing the markup-type document;
    computing final weights for the respective elements of the markup-type document by applying the previously established weights thereto;
    arranging the elements in a manner that the element having the computed weight of a higher order is arranged with priority; and
    generating a summary document with contents of the elements in accordance with individual priorities of the elements,
    wherein a weight of at least one class of category is further established, and the final weights of the elements are computed by multiplying the respective weights of the tags, the weight of each of the at least one page in accordance with a depth of each of the at least one page, and the weight of the at least one class of category.

2. The method of claim 1, wherein a summary range of the markup-type document is previously established before the step of generating the summary document and wherein the step generates the summary document with a quantity within the established summary range.

3. The method of claim 1, wherein a summary range of the pages which will become a summary target of the markup-type document is previously established before the generating step of generating the summary document, and wherein the arranging step is carried out on the pages of the summary target to generate the summary document.

4. The method of claim 1, the arranging step comprising the steps of:
    arranging the elements in the manner that the elements having the computed values of the higher orders are arranged with priority;
    generating the summary document with texts of the corresponding elements in accordance with the arranged order; and
    outputting the generated summary document to a currently operating digital TV.

5. The method of claim 4, wherein the steps of generating and outputting the summary document generate the summary document with the texts of the corresponding elements in accordance with the arranged order and output the generated summary document to the digital TV with currently streaming video and audio.

6. A method of summarizing markup-type documents automatically and displaying on digital TV sets, the method comprising steps of:
    providing markup-type documents, each of the markup-type documents including at least one page associated with a plurality of elements, each of the elements inserted between tags as a content;

establishing weights for the respective pages according to depths of the pages and weights for the respective tags in advance;

retrieving at least one of the markup-type documents when a random user requests a document search using a specific keyword;

computing final weights for the respective elements of the retrieved markup-type document by applying the previously established weights thereto;

arranging the elements in a manner that the element having a computed value of a higher order is arranged with priority to extract the contents of the corresponding elements; and outputting the extracted contents of the elements to the digital TV limitedly, wherein weights of respective classes of categories are further established, and the final weights of the respective elements are computed by multiplying the respective weights of the tags, the weights for the respective pages according to depths of the pages, and the weights of respective classes of categories.

7. The method of claim 6, wherein the establishing step establishes a lower weight for the page having a deeper depth.

8. The method of claim 6, wherein the arranging step arranges the elements in a manner that the elements having the computed values of the higher orders are arranged with priority and extracts texts of the corresponding elements in accordance with the arranged order.

9. The method of claim 6, wherein a summary range of the markup-type document is previously established before the outputting step.

10. The method of claim 6, the outputting step comprising the steps of:

comparing, as a summary range of the markup-type document is previously established, a quantity of the content of the extracted element to the summary range; and outputting the content of the extracted element within the summary range to the digital TV.

11. The method of claim 6, wherein the markup-type document is composed by a markup language of HTML (hypertext markup language) or XML (extensible markup language).

* * * * *